United States Patent
Anderton et al.

[19]

[11] Patent Number: 6,145,941
[45] Date of Patent: Nov. 14, 2000

[54] TRACK BUSHING HAVING IMPROVED ABRASION AND GALLING RESISTANCE

[75] Inventors: Peter W. Anderton; Phil J. Shankwitz; Chuong Q. Dam, all of Peoria, Ill.; Alan P. Dremann, Grenoble, France; William A. Holt, Dunlap, Ill.

[73] Assignee: Caterpillar Inc., Peoria, Ill.

[21] Appl. No.: 09/229,437

[22] Filed: Jan. 13, 1999

[51] Int. Cl.[7] .................................................. B62D 55/205
[52] U.S. Cl. .......................... 305/100; 305/203; 384/297; 384/625
[58] Field of Search ..................................... 305/100, 102, 305/103, 104, 105, 106, 202, 203, 192, 194; 384/276, 297, 625, 912, 913

[56] References Cited

U.S. PATENT DOCUMENTS

| | | | |
|---|---|---|---|
| 4,042,282 | 8/1977 | Haslett et al. | 305/194 |
| 4,848,934 | 7/1989 | Blakely et al. | 384/206 |
| 5,249,868 | 10/1993 | Watts | 384/276 |
| 5,593,234 | 1/1997 | Liston | 384/492 |
| 5,700,094 | 12/1997 | Dam et al. | 384/569 |

FOREIGN PATENT DOCUMENTS

| | | | |
|---|---|---|---|
| 2395439 | 2/1979 | France | 305/192 |

*Primary Examiner*—Russell D. Stormer
*Attorney, Agent, or Firm*—Kathleen M. Ryan; Maginot, Addison & Moore

[57] ABSTRACT

A track bushing for an endless track of a track-type vehicle includes a first end, a second end and a middle portion, an outer surface and an inner surface, a first sealing surface adjacent the first end and a second end sealing surface adjacent the second end, a first inner bearing surface adjacent the first end and a second inner bearing surface adjacent the second end, and an abrasion resistant coating deposited on at least one of (a) at least one of the first end sealing surface and the second end sealing surface, and (b) at least one of the first inner bearing surface and the second inner bearing surface. The coating is selected from the group consisting of chromium nitrides, chromium carbonitrides, and mixtures thereof. The track bushing exhibits much superior abrasion, corrosion, erosion and galling resistance.

20 Claims, 1 Drawing Sheet

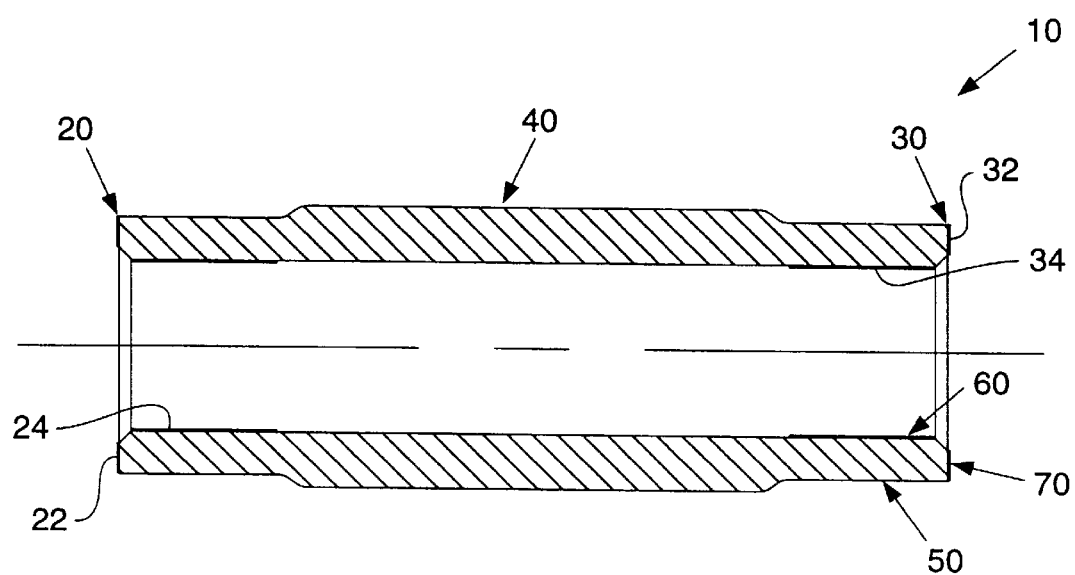

TRACK BUSHING HAVING IMPROVED ABRASION AND GALLING RESISTANCE

TECHNICAL FIELD

The present invention relates generally to track bushings for the endless tracks of a track-type vehicle, and more particularly to a track bushing having coated ends and internal surface for improved abrasion, corrosion and galling resistance.

BACKGROUND ART

The track bushings used in the track pins for linking the track links for the endless track of a track type vehicle, such as an earthmoving vehicle for example, are subjected to a very severe operating environment. The ends of the track bushing and the inner surface of the track bushing adjacent its two ends are the main bearing surfaces that respectively slide against the track seal and the track pin. The dirt and debris tend to wear the ends of the track bushings sliding against the sealing surface of a track seal. This happens because the dirt and debris particles get lodged between the seal and the bushing end surface and eventually wear a groove into the track bushing end. Further, the dirt and debris particles tend to work their way into the clearance between the track pin and the bushing and eventually wear the outer surface of the track pin or the inner surface of the track bushing. This type of a wear results in metal-to-metal transfer between the track pin and the track bushing, a phenomenon called "galling".

It is desirable to provide a track bushing that has a very hard, highly corrosion resistant coating that prevents the track bushing end from corrosion and erosion. It is also very desirable to provide a track bushing having a hard coating on its inner surface so as to prevent galling. It is also desirable to generally improve the surface finish of the aforementioned bearing surfaces of a track bushing so that they are more resistant to friction and wear.

The present invention is directed to overcome one or more problems of heretofore utilized track bushings for track-type vehicles.

DISCLOSURE OF THE INVENTION

In one aspect of the present invention, a track bushing for an endless track of a track-type vehicle is disclosed. The track bushing comprises a first end, a second end and a middle portion. The track bushing also comprises an outer surface and an inner surface. The track bushing further comprises a first end sealing surface adjacent the first end and a second end sealing surface adjacent the second end. The track bushing further comprises a first inner bearing surface adjacent the first end and a second inner bearing surface adjacent the second end. The track bushing still further comprises an abrasion resistant coating deposited on at least one of (a) at least one of the first end sealing surface and the second end sealing surface, and (b) at least one of the first inner bearing surface and the second inner bearing surface. The coating is selected from the group consisting of chromium nitrides, chromium carbonitrides, and mixtures thereof.

In another aspect of the present invention, an improvement in a track bushing is disclosed. The track bushing comprises a first end, a second end and a middle portion, an outer surface and an inner surface, a first end sealing surface adjacent the first end and a second end sealing surface adjacent the second end, and a first inner bearing surface adjacent the first end and a second inner bearing surface adjacent the second end. The improvement comprises depositing an abrasion resistant coating on (a) at least one of the first end sealing surface and the second end sealing surface, and (b) at least one of the first inner bearing surface and the second inner bearing surface. The coating is selected from the group consisting of chromium nitrides, chromium carbonitrides, and mixtures thereof.

BRIEF DESCRIPTION OF THE DRAWINGS

FIG. 1 is a sectional side view of a preferred embodiment of the track bushing of the present invention.

BEST MODE FOR CARRYING OUT THE INVENTION

Referring to FIG. 1, a track bushing 10 for an endless track of a track-type vehicle is shown. The track bushing 10 comprises a first end 20, a second end 30 and a middle portion 40. The track bushing 10 also comprises an outer surface 50 and an inner surface 60. The track bushing 10 further comprises a first end sealing surface 22 adjacent the first end 20 and a second end sealing surface 32 adjacent the second end 30. The track bushing 10 further comprises a first inner bearing surface 24 adjacent the first end 20 and a second inner bearing surface 34 adjacent the second end 30. The track bushing 10 still further comprises an abrasion resistant coating 70 deposited on (a) at least one of the first end sealing surface 22 and the second end sealing surface 32, and (b) at least one of the first inner bearing surface 24 and the second inner bearing surface 34. The coating 70 is selected from the group consisting of chromium nitrides, chromium carbonitrides, and mixtures thereof.

In the preferred embodiment of the present invention, the coating 70 has a thickness desirably in the range of about 0.0001 mm to about 0.02 mm, and preferably, in the range of about 0.0005 mm to about 0.01 mm. A thickness less than 0.0001 mm is undesirable because the coating tends to wear too soon. A thickness greater than 0.02 mm is undesirable because the coating can spall, resulting in premature wear. Desirably, the coating deposited on the first end sealing surface and/or the second end sealing surface has a thickness in the range of about 0.003 mm to about 0.008 mm and preferably, about 0.005 mm. These ranges are desirable because outside the lower range the coating will wear too soon and outside the upper range the coating might spall. Desirably, the coating deposited on the first inner bearing surface and/or the second inner bearing surface has a thickness in the range of about 0.0001 mm to about 0.005 mm, and preferably, about 0.002 mm. This range is desirable because at the lower end of the range coating thicknesses can be as low as 0.0001 mm for up to 20% of the length of the track bushing, the length being measured along the axial direction of the bushing and from either the first or the second end of the bushing. It is desirable to deposit a coating on the inner surface adjacent the first and/or the second end for a linear length of up to 20% of the total length of the bushing in order to obtain sufficient galling resistance. The total length of the bushing is the sum total of the lengths of the first portion, the second portion and the middle portion. In the preferred embodiment, the abrasion resistant coating is deposited by vapor deposition techniques and is preferably deposited on both the first end sealing surface and the second end sealing surface to get maximum corrosion/erosion resistance. Similarly, the abrasion resistant coating is deposited on both the first inner bearing surface and the second inner bearing surface for maximum galling resistance.

In the preferred embodiment, the coating is deposited on both sealing ends as well as both inner surfaces to attain a combination of corrosion/erosion and galling resistance.

In the preferred embodiment of the present invention, the coating 70 is desirably, selected from one of chromium nitrides and chromium carbonitrides, or mixtures thereof. Preferably, the coating is chromium nitride. CrN is preferred because it has been observed during performance tests that the abrasion, corrosion/erosion and galling resistance is much superior as compared to other coatings.

The coating is deposited desirably, by any one of the vapor deposition techniques, such as physical vapor deposition, chemical vapor deposition and arc vapor deposition. In the preferred embodiment of the present invention, the chromium nitride coating 70 is deposited by arc vapor deposition process which comprises the following steps: An arc source is provided. The arc source is adapted to impart a positive charge on the vapor generated. A negative bias voltage of about 50 volts is applied to the race substrate by a voltage source. A vapor deposition coating 70 is deposited on both the track bushing ends and the inner surfaces adjacent each end for up to about 20% of the total bushing length from either end. Such coating methods are well known to those skilled in the art of vapor deposition coating.

However, during arc vapor deposition, macroparticles having a size in the range of 0.01 μm to 0.05 μm are often produced in the vapors and these macroparticles may detrimentally affect the coating surface. Thus as an alternative, the above process may be improved in order to reduce the amount of macroparticles in the coating, such macroparticles being at least 0.01 μm in size, by providing a metallic wire mesh, preferably stainless steel having a preselected opening size desirably in the range of about 0.22 mm to about 0.86 mm, and preferably, of about 0.47 mm. The wire mesh is positioned in between the arc source and the substrate to be coated, say, the end bearing surface 22 for example, preferably at a distance of at least 15 mm from surface 22. A negative bias voltage of about 50 volts is applied to the wire mesh by a voltage source. The arc source provides a current in the range of about 50 Amps to about 250 Amps and imparts a positive charge on the macroparticles present in the vapor generated. The positively charged macroparticles are entrapped on the negatively biased wire mesh.

In an alternate embodiment of the invention, an improvement in a track bushing is disclosed. In a track bushing of the type described in FIG. 1 before, the improvement comprises depositing an abrasion resistant coating on (a) at least one of the first end bearing surface and the second end sealing surface, and (b) at least one of the first inner bearing surface and the second inner bearing surface. The coating is selected from the group consisting of chromium nitrides, chromium carbonitrides, and mixtures thereof. Preferably, the coating is CrN.

INDUSTRIAL APPLICABILITY

The present invention is particularly useful for improving the abrasion, corrosion and erosion resistance, as well as the galling resistance of track bushings used in the track pins for linking the track links for the endless track of a track type vehicle, such as an earthmoving vehicle for example. The present invention is expected to increase the useful service life of these track bushings by as much as 500% or more.

Other aspects, objects and advantages of this invention can be obtained from a study of the drawings, the disclosure and the appended claims.

What is claimed is:

1. A track bushing for an endless track of a track-type vehicle, comprising:
    a first end, a second end and a middle portion; an outer surface and an inner surface;
    a first end sealing surface adjacent said first end and a second end sealing surface adjacent said second end;
    a first inner bearing surface adjacent said first end and a second inner bearing surface adjacent said second end; and
    an abrasion resistant coating deposited on (a) at least one of said first end sealing surface and said second end sealing surface, and (b) at least one of said first inner bearing surface and said second inner bearing surface, said coating being selected from the group consisting of chromium nitrides, chromium carbonitrides, and mixtures thereof,
    wherein said middle portion does not have said abrasion resistant coating deposited thereon.

2. A track bushing, as set forth in claim 1, wherein said abrasion resistant coating is of chromium nitride.

3. A track bushing, as set forth in claim 1, wherein said coating has a thickness in the range of about 0.0001 mm to about 0.02 mm.

4. A track bushing, as set forth in claim 3, wherein said coating has a thickness in the range of about 0.0005 mm to about 0.01 mm.

5. A track bushing, as set forth in claim 4, wherein said coating deposited on one of said first end sealing surface and said second end sealing surface, has a thickness in the range of about 0.003 mm to about 0.008 mm.

6. A track bushing, as set forth in claim 5, wherein said coating deposited on one of said first end sealing surface and said second end sealing surface, has a thickness of about 0.005 mm.

7. A track bushing, as set forth in claim 4, wherein said coating deposited on one of said first inner bearing surface and said second inner bearing surface, has a thickness in the range of about 0.0005 mm to about 0.005 mm.

8. A track bushing, as set forth in claim 7, wherein said coating deposited on one of said first inner bearing surface and said second inner bearing surface, has a thickness of about 0.002 mm and extends for an axial length no greater than 20% of the total length of said bushing.

9. A track bushing, as set forth in claim 1, wherein said abrasion resistant coating is deposited by vapor deposition techniques.

10. A track bushing, as set forth in claim 1, wherein said abrasion resistant coating is deposited on said first end sealing surface and said second end sealing surface.

11. A track bushing, as set forth in claim 1, wherein said abrasion resistant coating is deposited on said first inner bearing surface and said second inner bearing surface.

12. A track bushing, as set forth in claim 1, wherein said abrasion resistant coating is deposited on both (a) said first end sealing surface and said second end sealing surface and (b) said first inner bearing surface and said second inner bearing surface.

13. In a track bushing having a first end, a second ends a middle portion, an outer surface, an inner surface, a first end sealing surface adjacent said first end, a second end sealing surface adjacent said second end, a first inner bearing surface adjacent said first end, and a second inner bearing surface adjacent said second end, an improvement comprising:
    an abrasion resistant coating deposited on said first end sealing surface and said second end sealing surface, wherein said middle portion does not have said abrasion resistant coating deposited thereon.

14. In a track bushing, as set forth in claim 13, the improvement wherein said abrasion resistant coating is of chromium nitride.

15. In a track bushing, as set forth in claim 13, the improvement wherein said coating has a thickness in the range of about 0.0001 mm to about 0.02 mm.

16. In a track bushing, as set forth in claim 15, the improvement wherein said coating has a thickness in the range of about 0.0005 mm to about 0.01 mm.

17. In a track bushing, as set forth in claim 16, the improvement wherein said coating deposited on one of said first end sealing surface and said second end sealing surface, has a thickness in the range of about 0.003 mm to about 0.008 mm.

18. In a track bushing, as set forth in claim 17, the improvement wherein said coating deposited on one of said first end sealing surface and said second end sealing surface, has a thickness of about 0.005 mm.

19. In a track bushing, as set forth in claim 16, the improvement wherein said coating is deposited on said first inner bearing surface and said second inner bearing surface, and has a thickness in the range of about 0.0005 mm to about 0.005 mm.

20. In a track bushing, as set forth in claim 19, the improvement wherein said coating deposited on one of said first inner bearing surface and said second inner bearing surface, has a thickness of about 0.002 mm and extends for an axial length no greater than 20% of the total length of said bushing.

* * * * *